(12) United States Patent
Schmaeling et al.

(10) Patent No.: US 10,859,154 B2
(45) Date of Patent: Dec. 8, 2020

(54) SCREW DRIVE

(71) Applicant: Robert Bosch GmbH, Stuttgart (DE)

(72) Inventors: Franz Schmaeling, Oberleichtersbach (DE); Helmut Ament, Kolitzheim (DE); Mario Ziegler, Bergtheim (DE); Michael Korbacher, Wipfeld (DE); Thomas Groganz, Kronungen (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 16/052,808

(22) Filed: Aug. 2, 2018

(65) Prior Publication Data
US 2019/0063591 A1    Feb. 28, 2019

(30) Foreign Application Priority Data

Aug. 24, 2017  (DE) .................. 10 2017 214 812

(51) Int. Cl.
*F16H 57/04* (2010.01)
*F16H 25/22* (2006.01)
*F16H 25/24* (2006.01)

(52) U.S. Cl.
CPC ..... *F16H 57/0497* (2013.01); *F16H 25/2252* (2013.01); *F16H 25/2418* (2013.01); *F16H 57/0416* (2013.01)

(58) Field of Classification Search
CPC ............. F16H 57/0497; F16H 25/2252; F16H 25/2418; F16H 57/0416
See application file for complete search history.

(56) References Cited

U.S. PATENT DOCUMENTS

| | | | | |
|---|---|---|---|---|
| 3,132,719 A | * | 5/1964 | Cole | F16H 57/0497 184/65 |
| 3,331,469 A | * | 7/1967 | Deflandre | B23Q 11/125 184/6.14 |
| 5,168,767 A | * | 12/1992 | Morita | F16H 25/2204 184/99 |
| 6,817,260 B2 | * | 11/2004 | Liao | F16H 25/2204 74/89.43 |
| 6,865,963 B2 | * | 3/2005 | Takanohashi | B29C 45/83 184/6.21 |
| 7,430,933 B2 | * | 10/2008 | Yatsushiro | F16H 25/2418 74/89.4 |
| 8,336,416 B2 | | 12/2012 | Chiu et al. | |
| 8,997,593 B2 | * | 4/2015 | Horng | F16H 25/24 74/89.4 |
| 2002/0170369 A1 | * | 11/2002 | Yabe | F16H 57/0497 74/89.44 |
| 2005/0255186 A1 | * | 11/2005 | Hiraga | F16H 25/24 425/542 |
| 2007/0227281 A1 | * | 10/2007 | Chen | F16H 57/0497 74/89.44 |

(Continued)

*Primary Examiner* — David M Fenstermacher
(74) *Attorney, Agent, or Firm* — Maginot, Moore & Beck LLP (57) ABSTRACT

A screw drive includes a spindle and a nut with a nut body. The nut body has at least one hole for a fastening member that is configured to enable the screw drive to be fastened on a higher-level subassembly or on a higher-level construction component. The at least one hole is further configured as a coolant duct of a coolant path. In one embodiment, an interior space between the nut body and the spindle is configured as a coolant duct.

20 Claims, 10 Drawing Sheets

(56) References Cited

U.S. PATENT DOCUMENTS

| | | | | |
|---|---|---|---|---|
| 2009/0133520 A1* | 5/2009 | Chen | ............... | F16H 57/0497 |
| | | | | 74/89.44 |
| 2011/0146430 A1* | 6/2011 | Chen | ............... | F16H 57/0497 |
| | | | | 74/89.44 |
| 2012/0042741 A1* | 2/2012 | Jacob | ............... | F16H 57/0464 |
| | | | | 74/89.44 |
| 2012/0266703 A1* | 10/2012 | Chuo | ............... | F16H 57/0497 |
| | | | | 74/89.44 |
| 2014/0000395 A1* | 1/2014 | Schwarzbach | ......... | F16H 25/12 |
| | | | | 74/89.44 |
| 2016/0160996 A1* | 6/2016 | Kohler | ............... | F16H 25/20 |
| | | | | 74/89.44 |

\* cited by examiner

SCREW DRIVE

This application claims priority under 35 U.S.C. § 119 to patent application no. DE 10 2017 214 812.8, filed on Aug. 24, 2017 in Germany, the disclosure of which is incorporated herein by reference in its entirety.

BACKGROUND

The disclosure relates to a screw drive.

In screw drives, high speeds of rotation and/or high load bearing capacities lead to a high power transmission capacity. Particularly in the case of planetary screw drives, which have a relatively poor efficiency in comparison with ball screw drives, a large amount of heat can be generated at the rolling contacts. To avoid exceeding a permitted operating temperature of the screw drive or of adjacent machine components, it may be necessary without cooling measures to interrupt a cycle or the operation of the screw drive and/or to reduce a load and/or a speed of rotation. If additional cooling is provided, heat can be dissipated by this means, which can increase the operating time.

U.S. Pat. No. 8,336,416 discloses a screw drive in the form of a ball screw drive. In this drive, a spindle or screw is provided, which is surrounded by a nut, wherein balls are then provided between the spindle and the nut. To cool the ball screw drive, a coolant structure in the form of cooling ducts is provided in a nut body of the nut. The disadvantage with this solution is the high outlay on equipment required to cool the screw drive.

SUMMARY

In contrast, it is the underlying object of the disclosure to provide a screw drive which can be cooled in a manner which is simple in terms of device engineering.

This object is achieved by a screw drive in accordance with the disclosure.

Advantageous further developments of the disclosure form the subject matter of the dependent claims.

According to the disclosure, a screw drive having a spindle is provided. This spindle can be surrounded by a spindle nut and can be in operative connection with the latter. The spindle nut preferably has a nut body, in which the spindle nut can be fastened on a subassembly or construction component, in particular a higher-level subassembly or construction component. The nut body can have at least one hole or a plurality of holes for a fastening means or for respective fastening means for connecting the spindle nut to the subassembly. The at least one hole is advantageously used as a coolant duct, or the holes are advantageously used as coolant ducts, wherein the at least one coolant duct or the coolant ducts is/are part or parts of a coolant path. As an alternative or in addition, provision can be made for an interior space provided between the nut body and the spindle to be used as a coolant duct, which is part of a coolant path or of the coolant path.

This solution has the advantage that a space which has already been provided or spaces which have already been provided in the nut is/are additionally used as a coolant duct or coolant ducts. It is thus possible to form a coolant path in a manner which is simple in terms of device engineering. By virtue of the design of the cooling elements in accordance with the disclosure, there is no need for interference in the design of a screw drive, e.g. a screw drive produced in series, for which reason the cooling system can also be retrofitted and can be produced and arranged in isolation from the variance of the nut body. Thus, frictional heat can be dissipated in a simple manner by cooling via the coolant path. In other words, existing fastening holes can be used to circulate liquid or gaseous coolant within a nut, in particular a flange nut. It is thus possible to use the interspace that exists in any case between the fastening means and the holes in the nut body as a cooling duct in a manner which is simple in terms of device engineering. As a result, there is direct heat transfer between the coolant and the nut. In the case of screw drives with a rotating spindle, the rotary union required for the spindle cooling system is then eliminated. Moreover, the nut can be more easily accessible than the spindle in many designs since the spindle can be connected to the drive, for example, or can be difficult to access through lubricating holes, thereby making it possible to reduce assembly effort since, of course, the coolant path is formed in the nut. Passing the coolant through the interior space is advantageous since this enables the nut to be made extremely compact in the radial direction. Moreover, there is direct cooling in the region of interaction between the nut and the spindle.

In the case of a multiplicity of holes, the embodiments and aspects envisaged above and below in respect of the hole in the nut body can apply in corresponding fashion to some of the holes or to all of the holes.

In another embodiment of the disclosure, the nut body can have a flange, wherein the at least one hole is then made in the flange. This is advantageous since the flange is easily accessible and connection of the hole to a coolant path can thus be made possible in a simple manner.

The at least one hole is designed as a through hole and extends, for example, parallel to and at a distance from the longitudinal axis of the spindle. As a result, a fastening screw which passes through the through hole can then be provided as a fastening means, for example. It is also conceivable to provide a plurality of holes or through holes in order, on the one hand, to arrange more fastening means and, on the other hand, to form a longer coolant path.

At least one first opening of the hole, in particular one first end opening of the hole, is preferably provided as an inlet opening for a coolant, and at least one second opening of the hole, in particular one second end opening of the hole, is preferably provided as an outlet opening for coolant. Thus, coolant can flow through the hole from the inlet opening to the outlet opening. If a fastening screw is provided as a fastening means, the cooling duct formed by the hole can then be of annular or hollow-cylindrical design, being delimited by an outer lateral surface of the fastening screw and an inner wall of the hole.

If a plurality of holes is provided, they are preferably arranged on a pitch circle in order to allow uniform heat dissipation.

The nut body, in particular the flange, has two mutually opposite ends. These can each be covered, at least in some region or regions, by a cover. At least one fluid duct or fluid ducts for fluidically connecting the holes can then be formed in at least one cover or in a respective cover. Thus, the coolant path can extend over a plurality of holes in a manner which is simple in terms of device engineering since these holes are connected via the cover or the covers. For example, the at least one fluid duct can be made as a groove in the cover or the respective cover in a manner which is simple in terms of device engineering. The covers are designed in a space-saving manner as disks, for example. As a further simple measure in terms of device engineering, the cover or the covers can be fixed on the spindle nut by means of the fastening means, eliminating the need for any additional fastening means. The cover or covers is/are preferably of annular design.

A sealing means or a plurality of sealing means to seal off the coolant duct can be provided between a cover or a respective cover and the nut body, in particular the flange. The sealing means can be designed as an O-ring or sealing ring, for example. It is also conceivable to design the sealing means as a flat gasket. One annular sealing means can be provided radially on the outside of the holes, for example, and one sealing means can be provided radially on the inside of the holes between a respective cover and the nut body. Thus, the holes are sealed off radially toward the inside and radially toward the outside.

The cover or covers has/have a hole or a hole pattern which can be brought into overlap with the hole or with the holes in the nut body in order, for example, to pass fastening screws through the cover or covers and the nut body. The fastening screws can then be supported by means of the screw head thereof on the cover. It is furthermore conceivable for the holes in the cover or covers to be surrounded on the outside and/or on the inside by sealing rings. Sealing elements on the screw head are then preferably arranged between a respective screw head and the cover. Sealing elements associated with the subassembly can be arranged between the cover and the subassembly.

As a further embodiment of the disclosure, it is possible, in the case of a plurality of holes, for the inlet opening of a first hole to be connected to one fluid connection and for the outlet opening of a further hole, in particular a final hole, to be connected to a further fluid connection. Thus, one hole serves as an inlet for the coolant path and another hole serves as an outlet. If a multiplicity of holes is provided, the inlet openings thereof can be arranged alternately on the two ends of the nut body or of the flange when viewed in the circumferential direction of the nut body. The outlet openings can thus then likewise be provided in alternating fashion in a corresponding manner. Starting from the first hole, it is then possible, when viewed in a first circumferential direction of the nut body or flange, for a respective hole to be connected via its outlet opening to the inlet opening of the adjacent hole via a corresponding fluid duct of the corresponding cover. The outlet opening of the last hole is then preferably not connected to the first hole but to the further fluid connection. The coolant path can then extend in a meandering way via the holes from the inlet-side fluid connection to the outlet-side fluid connection and can thus dissipate heat over a large area in a manner which is simple and compact in terms of device engineering.

In order to enable simple connection of the coolant path, fluid connections can be provided on a common end of the spindle nut, in particular of the flange. In order to avoid affecting the fastening of the spindle nut by means of fastening screws, a respective fluid connection can be arranged between two holes when viewed in the circumferential direction of the nut body. This furthermore leads to a space-saving design of the fluid connections. For a respective fluid connection, one connection piece can be provided in each case in a cover—in particular a common cover—wherein a respective connection piece is screwed into the cover, for example. The first fluid connection, e.g. with its connection piece—is then preferably formed adjacent to the first hole and can be connected to the inlet opening of said hole via a fluid duct provided in the cover. The further fluid connection is then formed adjacent to the last hole, for example—in particular with its connection piece—and is connected to the outlet opening of said hole via a fluid duct provided in the cover.

In another preferred illustrative embodiment of the disclosure, the interior space can in each case be sealed off by means of sealing elements, in particular annular sealing elements, provided on the ends of the nut. If no seal is provided, coolant could escape randomly from the interior space.

To introduce fluid into the interior space, an attachment is preferably arranged on the end of the nut. An attachment of this kind is simple to retrofit. For example, the nut body has an inner circumferential groove at the end when viewed in the longitudinal direction, into which groove the attachment then engages and is retained thereby in a manner which is simple in terms of device engineering. A circumferential groove of this kind is provided in the prior art to accommodate a sealing element, for example, thus making it a simple matter to insert the attachment in place of the sealing element and thus to retrofit it. The sealing element which can be inserted into the circumferential groove in the prior art is then provided on the attachment, for example. The attachment is preferably of annular design and surrounds the spindle. When viewed in the longitudinal direction, the sealing element can be formed on the outer end section of the attachment and can surround the spindle.

The attachment preferably has at least one fluid connection in order to introduce fluid into the interior via the attachment.

The sealing element on the attachment preferably has a smaller gap or radial gap between the spindle and the sealing element than the further sealing element on the end. Thus, a fluid introduced via the attachment, e.g. air, emerges from the nut substantially via the further sealing element. Thus, the fluid then flows through the nut from the attachment, via the interior space, to the further sealing element.

The attachment is preferably designed as a sleeve, which has one or more feed spaces radially on the inside. This feed space or these feed spaces can be open toward the nut body and closed at least partially or substantially or completely radially toward the inside, radially toward the outside and axially toward the outside. The feed space is preferably of annular or at least partially annular design and extends around or at least around a section of the spindle, and its opening faces the nut body. Thus, a fluid introduced via the attachment can be distributed in the circumferential direction and into the interior space, ensuring that the fluid flows through a large area of the nut. The feed space can preferably be connected to a coolant path via an outward-extending fluid connection or via a plurality of outward-extending fluid connections. At least two fluid connections, which are arranged on a pitch circle and/or diametrically opposite, are preferably provided. Thus, the fluid can be introduced uniformly into the feed space.

A gas, in particular air, for example, is provided as the coolant, in particular for the interior space. This is advantageous since then the coolant path does not have to be of closed design but can be open to the environment without polluting the environment. However, it is also conceivable, as an alternative or in addition, to provide a liquid coolant, particularly for the coolant path implemented by means of the holes.

In another preferred illustrative embodiment, it is possible, as an alternative or in addition to the attachment or to the coolant ducts provided in holes, to make a fluid duct in the nut body, in particular radially, to carry coolant from the outside into the interior space. If a flange is provided, the fluid duct can pass through the flange, in particular radially. If no attachment is provided, fluid introduced via the fluid duct, e.g. air, can then extend in both longitudinal directions and can emerge, for example, via both sealing elements, which have an identical sealing gap, for example.

The nut is designed as a cylindrical or flanged nut, for example.

The spindle preferably has external profiling, and the nut has internal profiling, wherein a plurality of planets is then arranged between the profiling when viewed in the radial direction, said planets engaging via respective external profiling in the profiling of the spindle and of the nut. External toothing can be provided on both end sections of each planet, said toothing in each case engaging in a respective separate ring gear, wherein the two ring gears are then preferably secured in the nut. Arranged after each ring gear, as viewed from the inside of the nut in the longitudinal direction, is a guide washer, each of said washers having a guide opening for a respective planet. The planets then each engage in the guide openings by means of a guide journal on the end. One or more recesses can additionally be introduced into one of the guide washers or into both guide washers to enable fluid to flow into the interior space or out of the interior space with little flow resistance.

BRIEF DESCRIPTION OF THE DRAWINGS

Preferred illustrative embodiments of the disclosure are explained in greater detail below by means of schematic drawings, in which.

DETAILED DESCRIPTION

Figure 1:
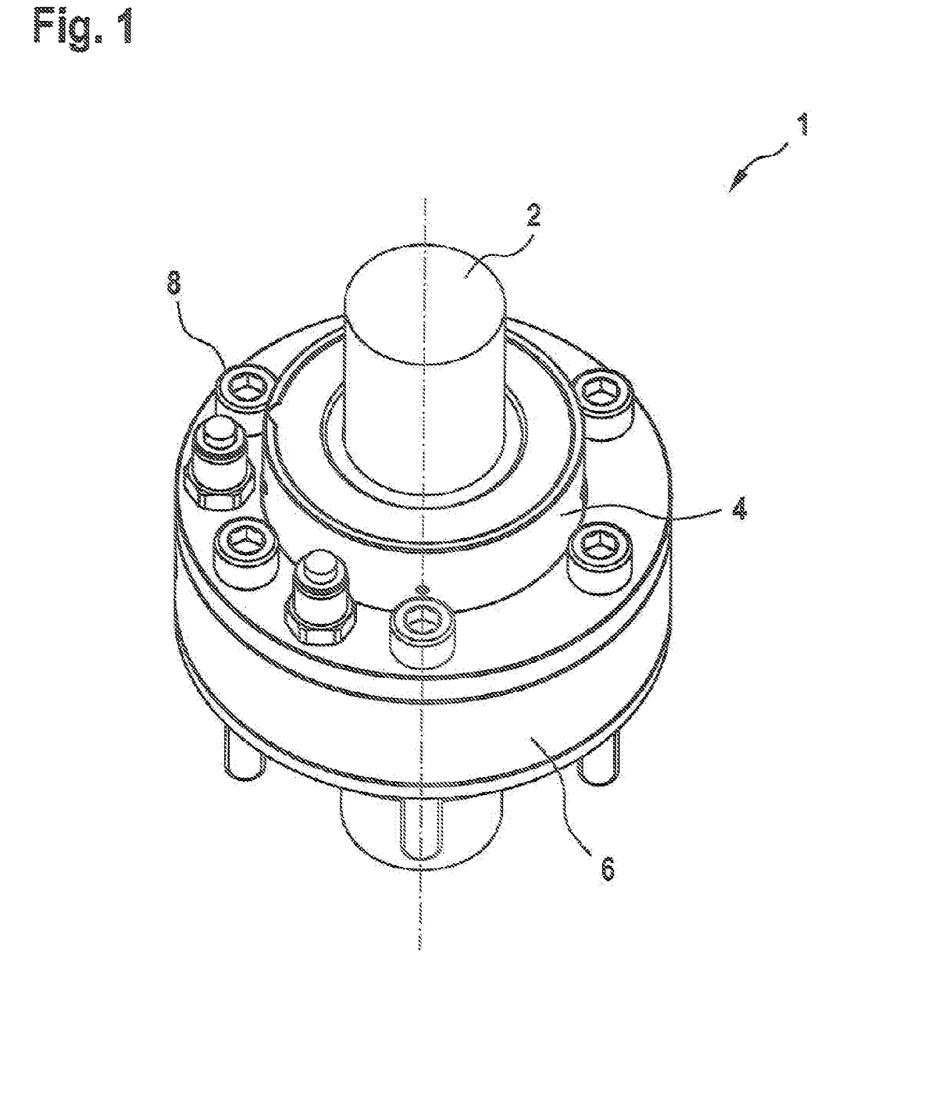
FIG. 1 shows a screw drive in accordance with a first illustrative embodiment in a perspective illustration.

According to FIG. 1, a screw drive in the form of a planetary screw drive has a spindle 2, which is surrounded by a nut 4. This nut has a flange 6, which can be connected to a subassembly (not shown) by means of a multiplicity of fastening means in the form of fastening screws 8.

Figure 2:
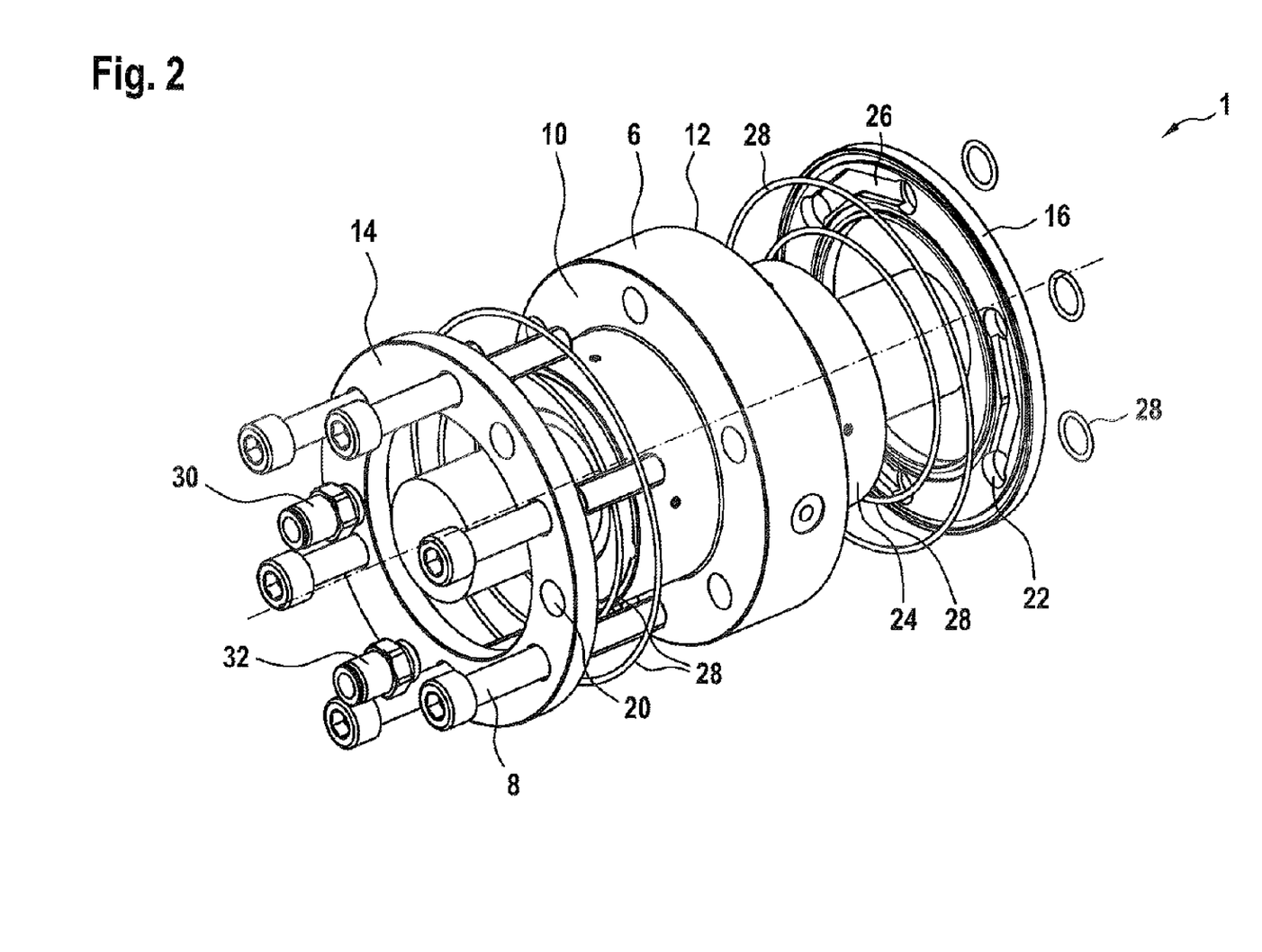
FIG. 2 shows the screw drive from FIG. 1 in an exploded illustration.

According to FIG. 2, the flange 6 has a first and second end face 10, 12 when viewed in the longitudinal direction. An annular cover 14 is arranged on end face 10, and an annular cover 16 is arranged on end face 12. Six holes 18, which are configured as through holes and extend approximately parallel to and at a distance from the longitudinal axis of the screw drive 1, are made in the flange 6 on a pitch circle. Furthermore, cover 14 has through holes 20, and cover 16 has through holes 22. Here, six holes are in each case likewise provided, which are arranged to correspond to the hole pattern of the flange 6. The fastening screws 8 can be passed through the holes 18 to 22 and connected, in particular screwed, to a subassembly. After screw fastening, the covers 14, 16 and the flange 6, which is formed on a nut body 24, are fixed on the subassembly by means of the fastening screws 8. The holes 18 for the fastening screws 8 are advantageously used as coolant ducts in addition. These can be fluidically connected via fluid ducts 26 introduced into the covers 14 and 16. According to FIG. 2, the fluid ducts 26 of cover 16 are visible here. To seal off the holes 18 and the fluid ducts 26 with respect to the outside, sealing elements in the form of sealing rings 28 are provided.

Figure 3:
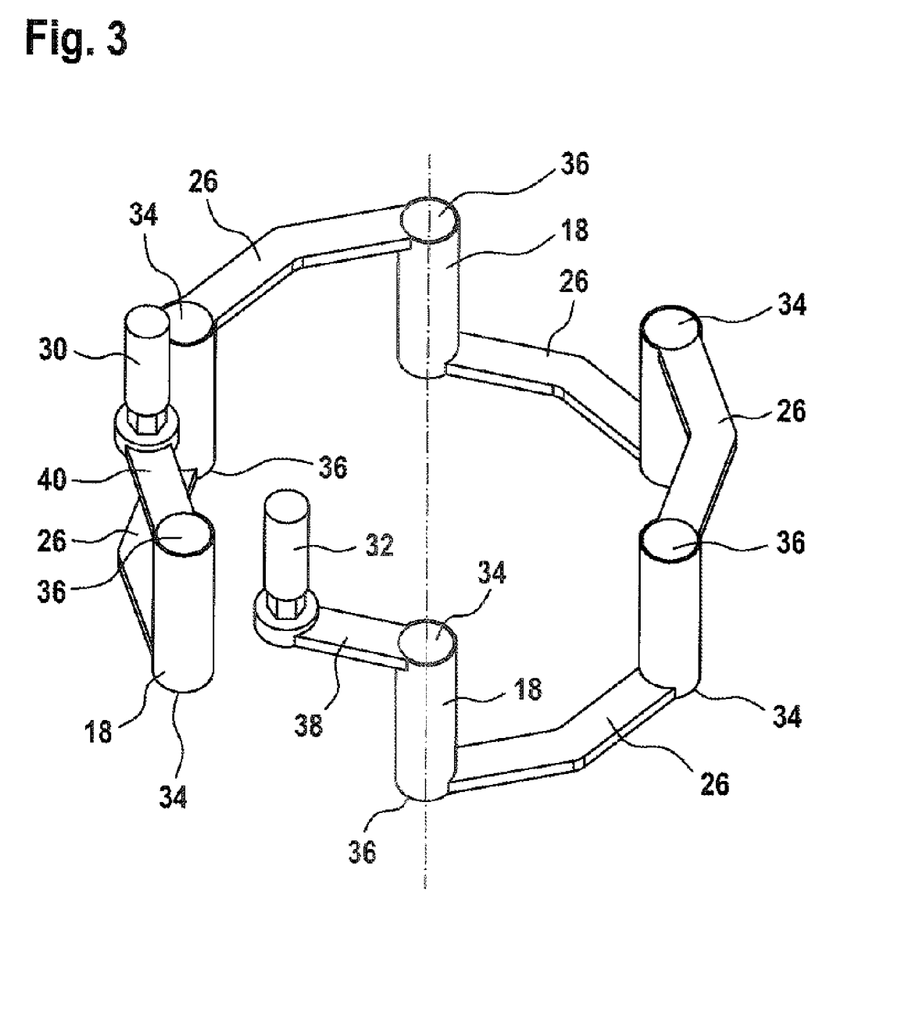
FIG. 3 shows schematically a coolant path of the screw drive from FIG. 1, FIGS. 4a to 4c show various illustrations of the screw drive from FIG. 1.

The coolant path, which is formed, in particular, by the holes 18 and the fluid ducts 26, is illustrated schematically in FIG. 3. According to FIG. 3, the circumferential surfaces are provided in the flange 6 and the covers 14, 16 and fluid connections 30, 32, see FIG. 2. The openings in the holes 18 serve either as inlet openings 34 or outlet openings 36. The inlet openings 34 of the holes 18 are formed alternately either on end face 10 or 12, see also FIG. 2. The coolant path then extends from fluid connection 32, via a first fluid duct 38, which is formed in cover 14, to the inlet opening 34 of the first hole 18. The outlet opening 36 of the first hole 18 is then connected to the inlet opening 34 of the adjacent hole 18 by fluid duct 26, which is formed in cover 16. The outlet opening 36 of said hole is then, in turn, connected to the inlet opening 34 of the next hole 18 by a fluid duct 26 provided in cover 14. Such a configuration is then provided as far as the last hole 18 when viewed in the circumferential direction in FIG. 3, which is then connected to fluid connection 30 by a fluid duct 40, which is formed in cover 14.

Figure 4A:
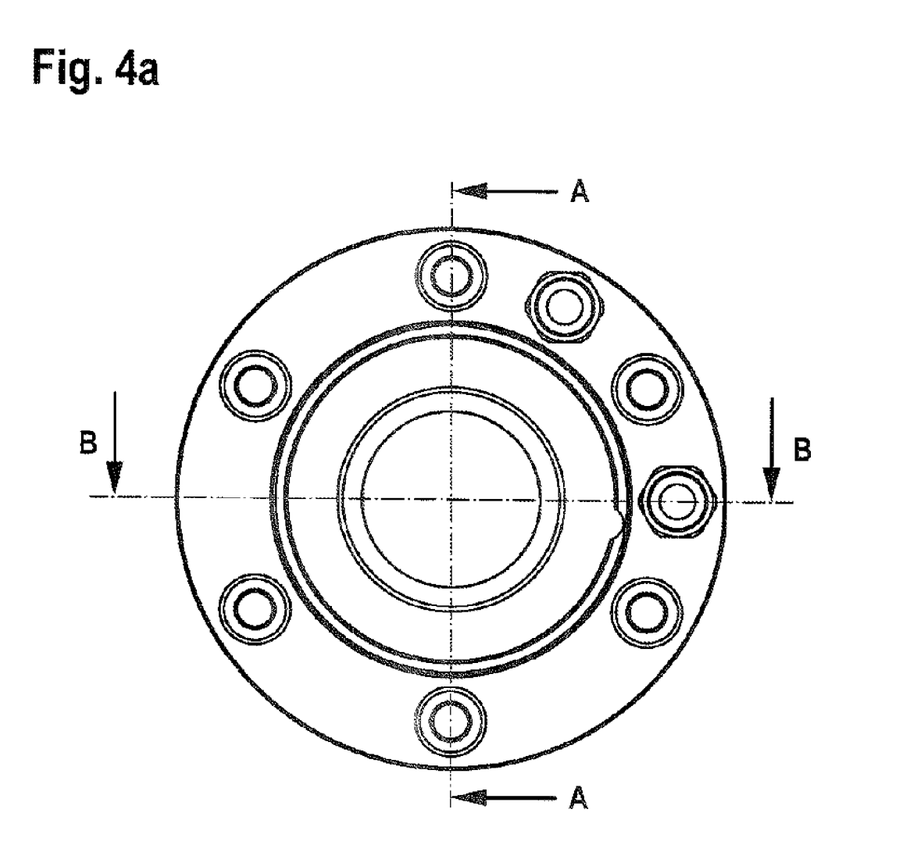
Figure 4B:
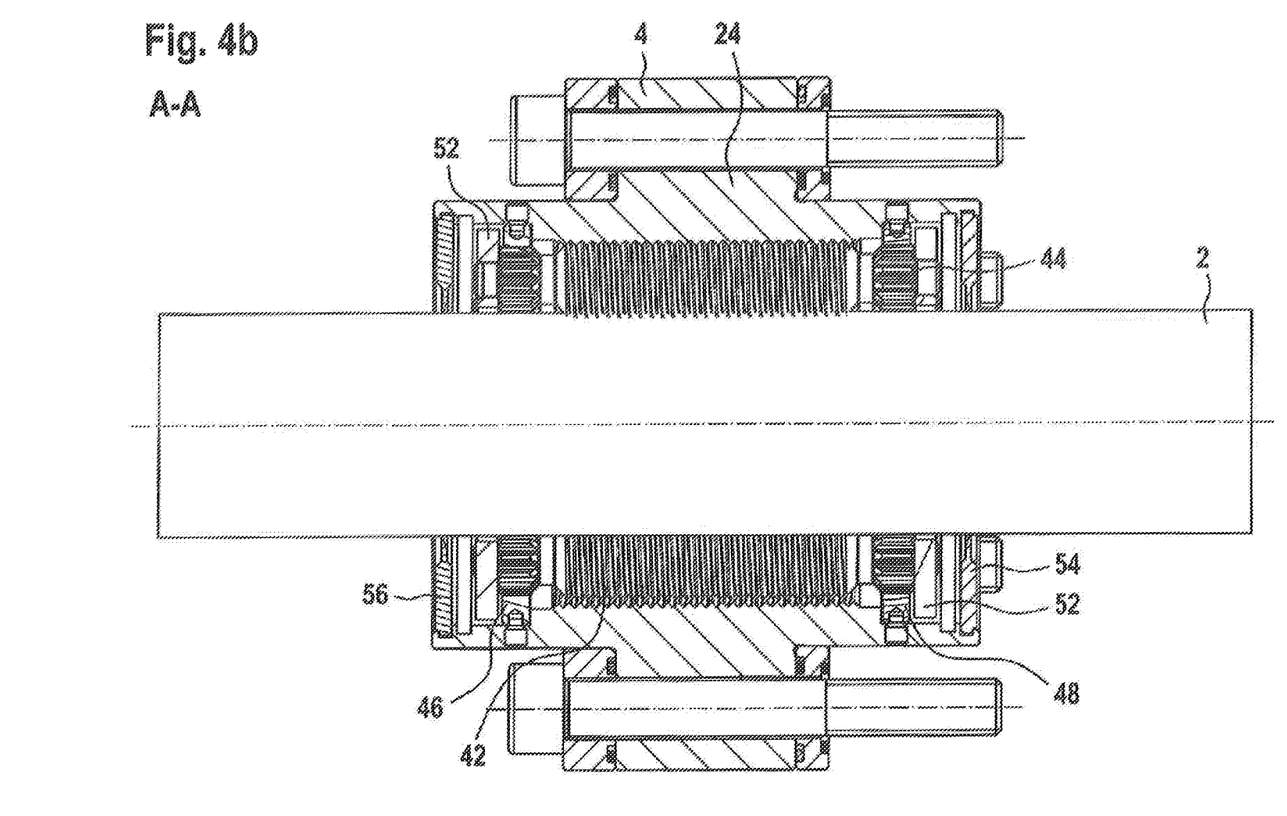

A front view of the screw drive 1 from FIG. 1 is shown in FIG. 4a. According to FIG. 4a, a section along section line A-A from FIG. 4a is then shown. Here, it can be seen that a multiplicity of planets 42 is arranged between the nut body 24 of the nut 4 and the spindle 2. These are in thread engagement both with the nut body 24 and with the spindle 2. The planets 42 each have external toothing 44 on the ends, the toothing in each case being in engagement with a respective ring gear 46, 48 fixed in the nut body 24. A respective guide washer 50, 52 for guiding the planets 42 is arranged after the respective ring gear 46, 48, when looking outward in the longitudinal direction. A respective sealing element 54, 56 is provided after a respective guide washer, when looking outward in the longitudinal direction, said sealing elements being secured on the nut body 4 and surrounding the spindle 2. The sealing elements 54, 56 are of annular design and each have a sealing lip radially on the inside.

Figure 4C:
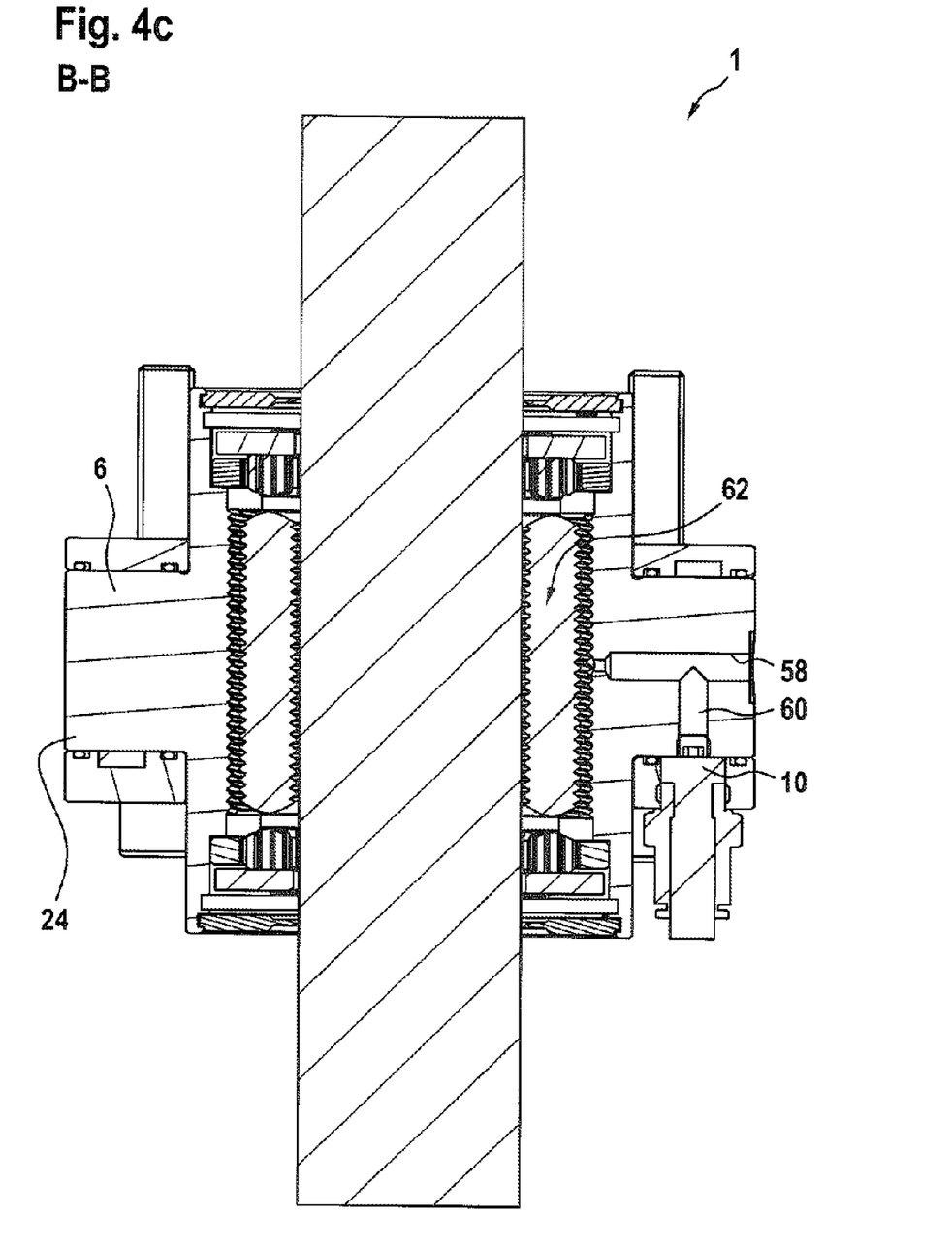

The screw drive 1 is shown along section line B-B according to FIG. 4c. It can be seen that a fluid duct 58 is introduced—radially for example—into the nut body 24, starting from the lateral surface thereof. This duct can be closed radially with respect to the outside. Opening into fluid duct 58 there is then a fluid duct 60 introduced—axially for example—into the flange 6, said fluid duct 60 extending from the end face 10, for example. Fluid duct 60 is preferably connected to fluid connection 30, see also FIGS. 2 and 3. An interior space 62 within the nut 4 can thereby additionally be supplied with a coolant.

Figure 5:
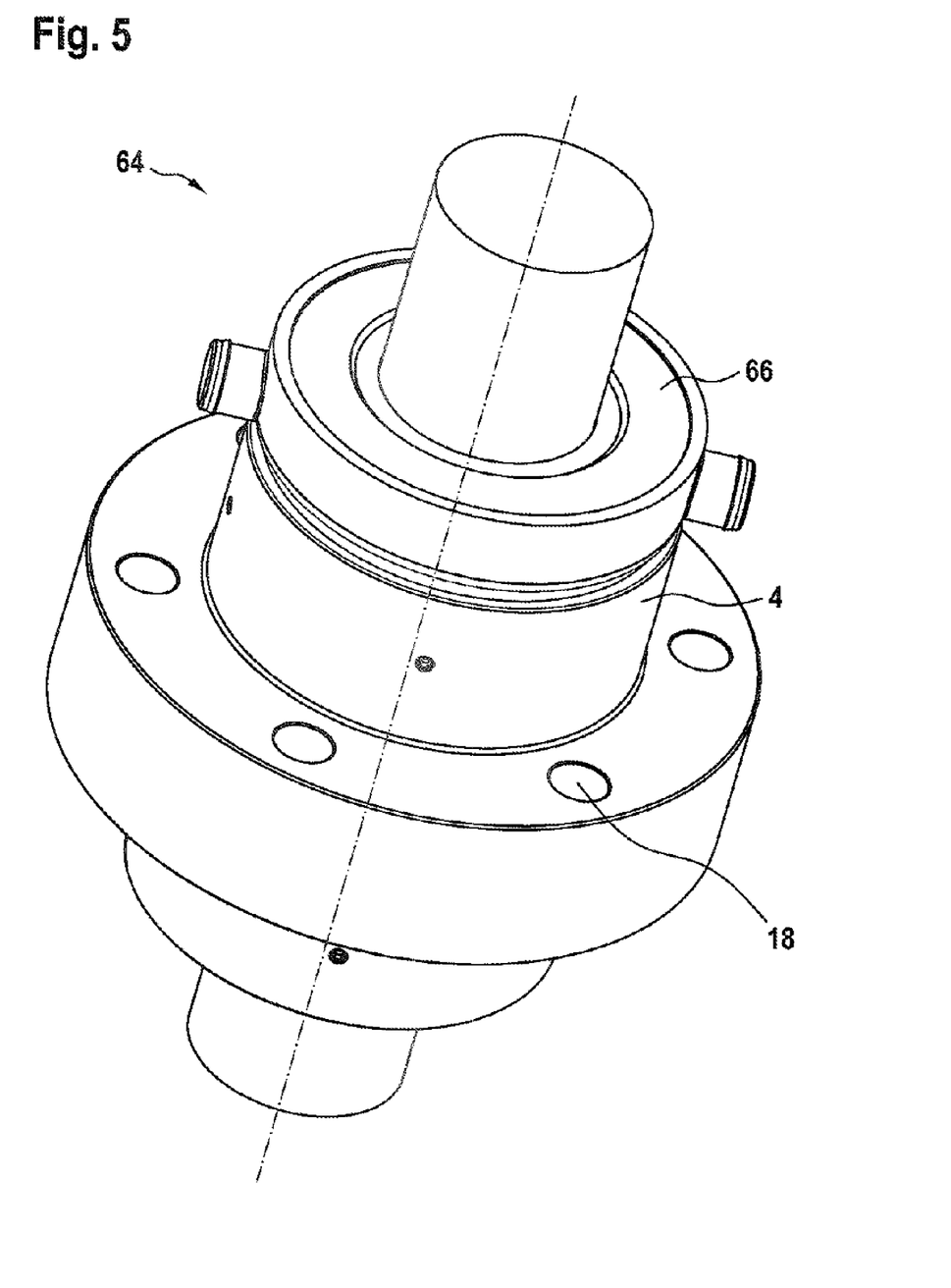
FIG. 5 shows a screw drive in accordance with another illustrative embodiment in a perspective illustration.

Another screw drive 64 is shown in a perspective view in FIG. 5. As an alternative or in addition to the coolant path formed by the holes 18, this drive has an attachment 66, which is secured on the end of the nut 4.

Figure 6:
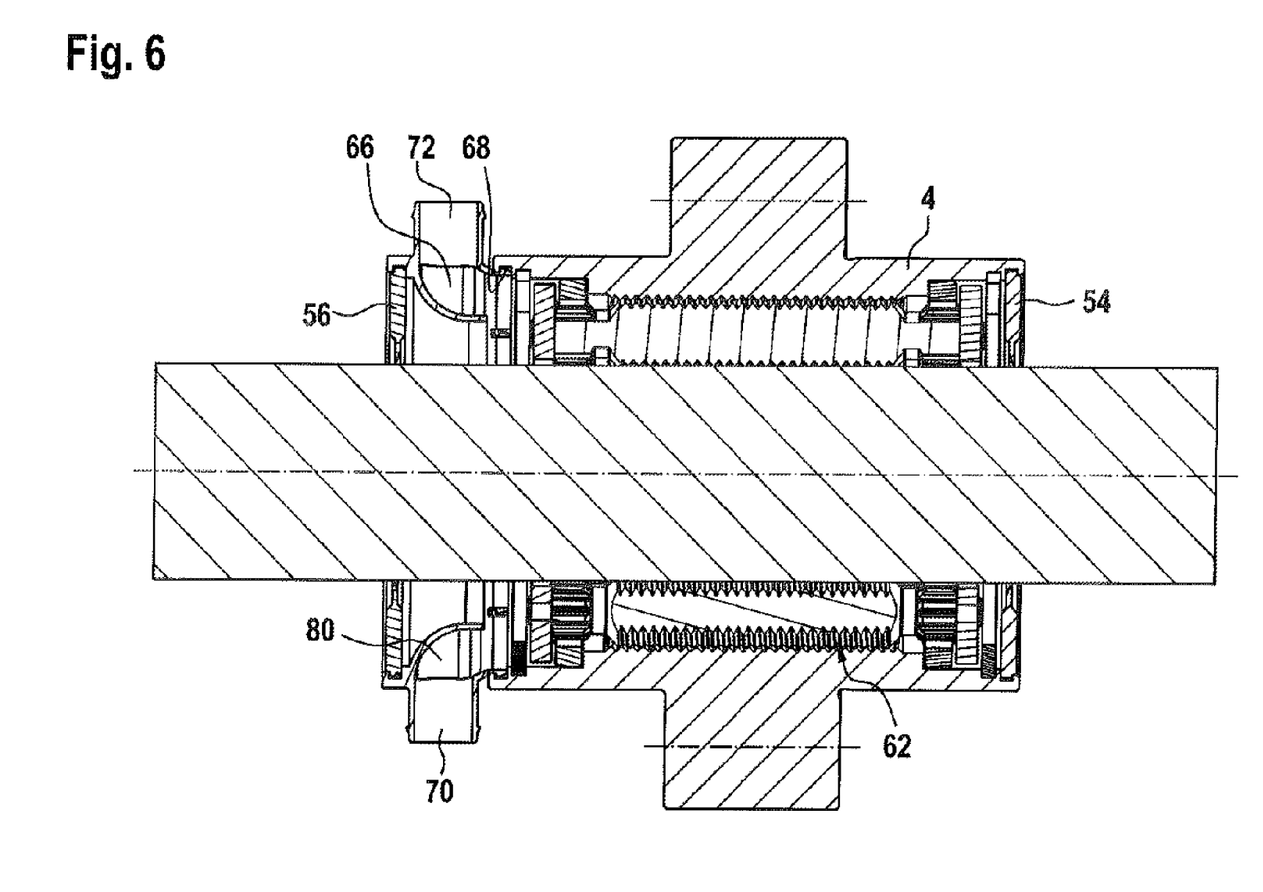
FIG. 6 shows the screw drive from FIG. 5 in a longitudinal section.

According to FIG. 6, the attachment 66 is held on a circumferential groove 68, into which a sealing element is inserted in the case of a screw drive without the attachment 66, see sealing element 56 from FIG. 4b, for example. The approximately sleeve-shaped attachment 66 then has sealing element 56 in its end section remote from the nut 4. The attachment 66 furthermore has a first and a second fluid connection 70, 72, via which fluid, in particular air, can be introduced into the interior space 62.

Figure 7:
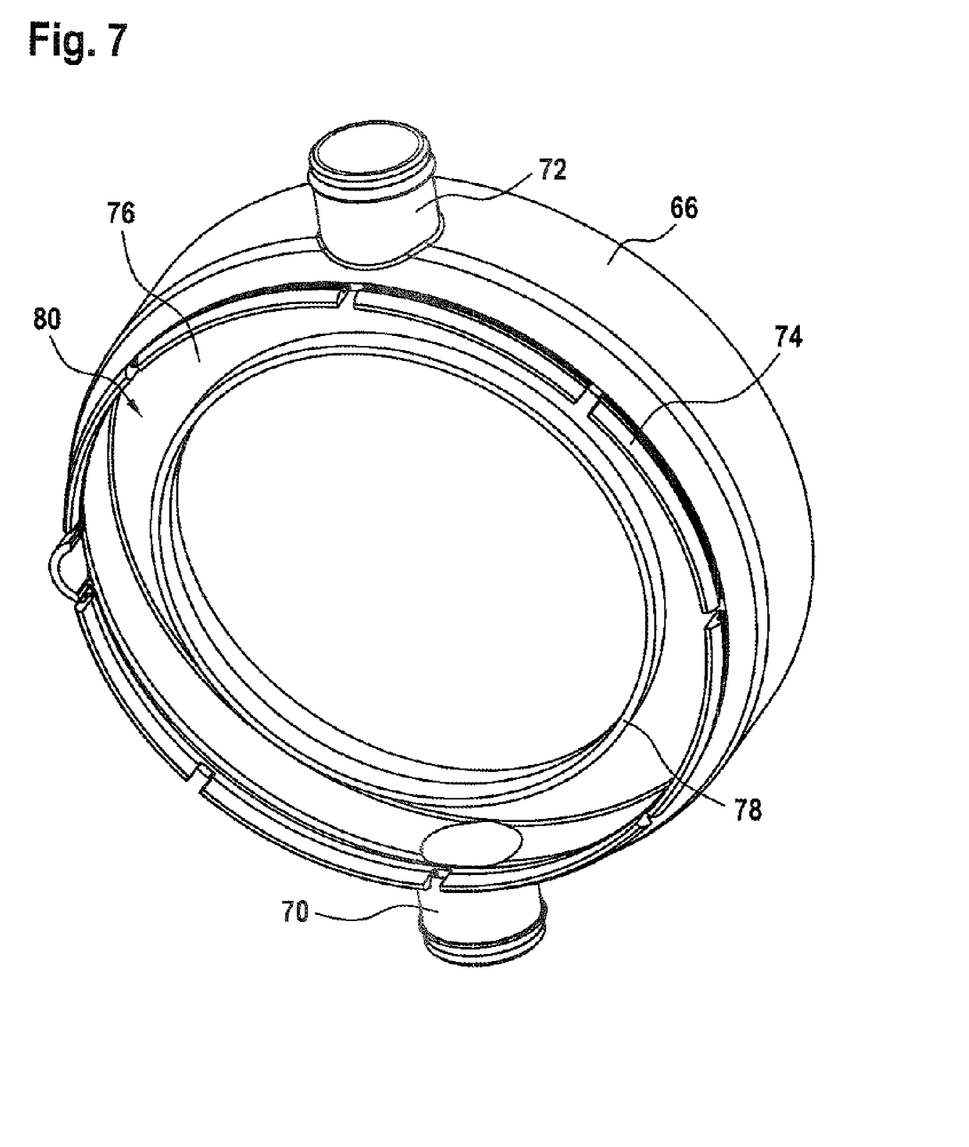
FIG. 7 shows an attachment of the screw drive from FIG. 5 in a perspective illustration.

According to FIG. 7, the attachment 66 has at least one or more springs 74 extending around its end facing the nut 4, which can then engage behind the circumferential groove 68 shown in FIG. 6. An inner collar 76, in particular an annular inner collar, extends inward, in particular radially inward, from the sleeve-shaped attachment 66. A sleeve section 78 then extends inward in the axial direction from the inner collar 76 toward the nut 4, see FIG. 6. By means of the inner collar 76 and the sleeve section 76, a feed space 80 open toward the nut 4 is then formed. This space can then be supplied with air via the diametrically provided fluid connections 70 and 72. The air can then be introduced uniformly into the interior space 62 via the feed space 80. In this arrangement, a sealing gap of sealing element 54 is advantageously larger than in the case of sealing element 56, thus allowing the air supplied to escape to the outside again via sealing element 54.

Figure 8:
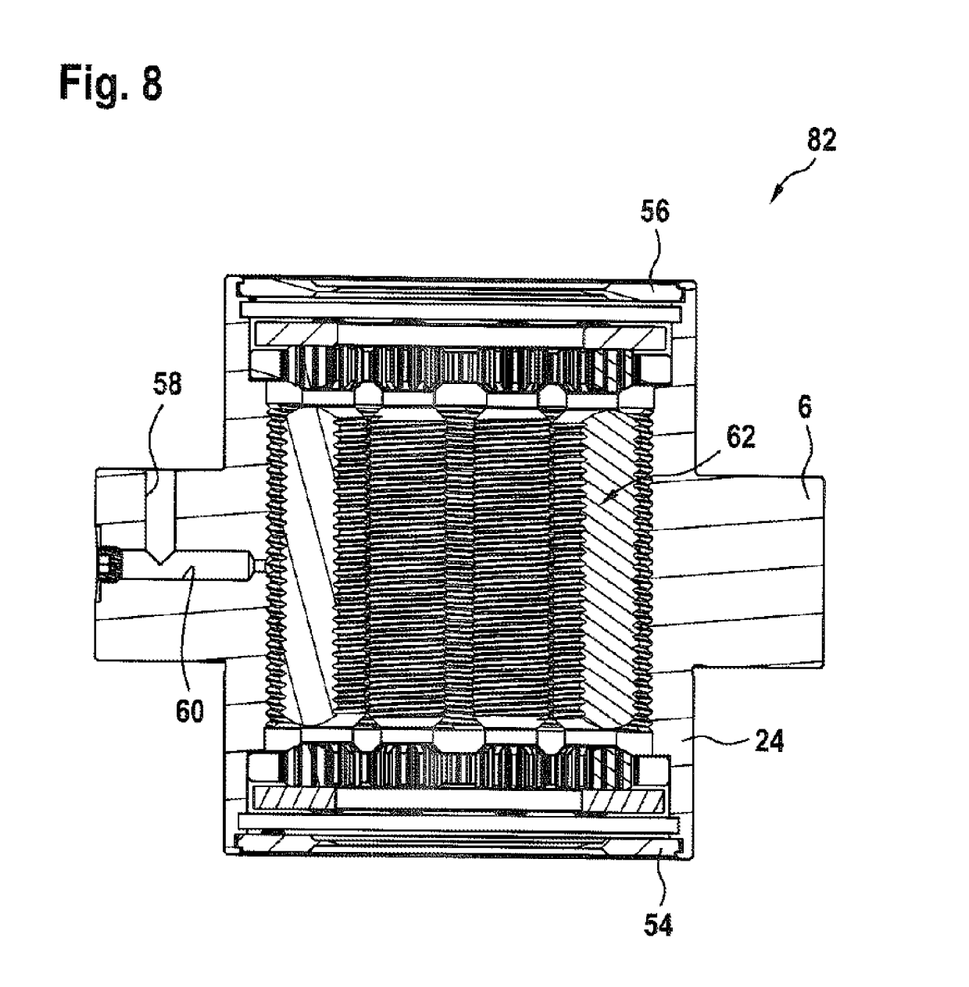
FIG. 8 shows a screw drive in accordance with another illustrative embodiment in a longitudinal section.

FIG. 8 shows a screw drive 82 in which, in contrast to the embodiment shown in FIG. 4c, only fluid ducts 58 and 60 are provided. Via these ducts, a fluid, e.g. air, can then be passed into the interior space 62 and then escape to the outside via the sealing elements 54, 56. When viewed in the axial direction, the flange 6 is preferably formed approximately centrally on the nut body 24.

The cooling systems in the various embodiments shown in FIGS. 1 to 8 can also be combined.

It is conceivable that the holes 18 in the nut body 24 for the fastening screws have a larger diameter than in the prior art, in comparison with a corresponding standard for example, in order to increase a flow cross section for fluid.

A disclosure is made of a screw drive having a spindle and a nut. In this arrangement, the nut has a nut body. By way of example, the nut body has a hole for a fastening means to enable the screw drive to be fastened on a higher-level subassembly or on a higher-level construction component. The at least one hole can then be used as a coolant duct of a coolant path. As an alternative or in addition, provision can be made for an interior space between the nut body and the spindle to be used as a coolant duct.

LIST OF REFERENCE SIGNS

1; 64; 82 screw drive
2 spindle
4 nut
6 flange
8 fastening screw
10 end face
12 end face
14, 16 cover
18, 20, 22 hole
24 nut body
26, 38, 40, 58, 60 fluid duct
28 sealing element
30 fluid connection
32 fluid connection
34 inlet opening
36 outlet opening
42 planet
44 external toothing
46, 48 ring gear
50, 52 guide washer
54, 56 sealing element
62 interior space
66 attachment
68 circumferential groove
70, 72 fluid connection
74 spring
76 inner collar
78 sleeve section
80 feed space

What is claimed is:

1. A screw drive, comprising:
a spindle nut having a nut body; and
a spindle surrounded by the spindle nut,
wherein the nut body has at least one through hole that is configured to receive a fastening member and form a coolant duct of a portion of a first coolant path, the fastening member configured to protrude from at least one end of two mutually opposite ends of the nut body and connect the spindle nut to a higher-level subassembly.

2. The screw drive according to claim 1, wherein the nut body has a flange, and wherein the at least one through hole is formed in the flange.

3. The screw drive according to claim 1, wherein the at least one through hole is a plurality of through holes.

4. The screw drive according to claim 3, wherein the two mutually opposite ends are each covered by a cover, and wherein at least one cover defines at least one fluid duct configured to fluidically connect at least two through holes.

5. The screw drive according to claim 4, wherein the at least one cover is a unitary body that encircles the spindle, and wherein the at least one fluid duct is configured as a groove in the at least one cover.

6. The screw drive according to claim 5, wherein the groove is recessed axially in the at least one cover.

7. The screw drive according to claim 3, wherein at least one first opening of each through hole is an inlet opening for a coolant, and wherein at least one second opening of each through hole is an outlet opening for the coolant.

8. The screw drive according to claim 7, wherein the two mutually opposite ends are each covered by a cover, and wherein, in the case of the plurality of through holes, the inlet openings are arranged alternately on the two ends when viewed in the circumferential direction of the nut body.

9. The screw drive according to claim 7, wherein, in the case of the plurality of through holes, the inlet opening of a first through hole is connected to one fluid connection, and the outlet opening of a further through hole is connected to a further fluid connection.

10. The screw drive according to claim 3, wherein the coolant path extends in a meandering way via the through holes from an inlet-side fluid connection to an outlet-side fluid connection.

11. The screw drive according to claim 3, wherein the two mutually opposite ends are each covered by a cover, wherein each cover defines respective fluid ducts configured to fluidically connect the through holes.

12. The screw drive according to claim 11, wherein each cover is a unitary body that encircles the spindle, and wherein each fluid duct is configured as a groove in the respective cover.

13. The screw drive according to claim 1, wherein at least one first opening of the through hole is an inlet opening for a coolant, and wherein at least one second opening of the through hole is an outlet opening for the coolant.

14. The screw drive according to claim 13, wherein the coolant is air.

15. The screw drive according to claim 1, further comprising an attachment configured to introduce fluid into an interior space disposed between the nut body and the spindle, the attachment arranged on the end of the nut body and the interior space configured as a coolant duct of a portion of a second coolant path.

16. The screw drive according to claim 15, further comprising a sealing element on the outer end section of the attachment when viewed in the longitudinal direction, wherein the sealing element has a smaller sealing gap than a further sealing element disposed on the end of the nut, and wherein the sealing elements seal off the interior space at the ends when viewed in the longitudinal direction.

17. The screw drive according to claim 15, wherein the attachment is configured as a sleeve that defines an annular feed space radially on the inside, the feed space being open toward the nut body and closed at least partially radially toward the inside, radially toward the outside, and axially toward the outside.

18. The screw drive according to claim 1, wherein an interior space disposed between the nut body and the spindle is configured as a coolant duct of a portion of a second coolant path, the second coolant path disposed substantially radially inwardly from the first coolant path.

19. The screw drive according to claim 18, wherein the first and second coolant paths have a common inlet opening and separate outlet openings.

20. The screw drive according to claim 1, wherein the nut body defines a fluid duct configured to carry coolant from the outside into an interior space disposed between the nut body and the spindle, the interior space configured as a coolant duct of a portion of a second coolant path.

* * * * *